United States Patent
Monette et al.

(10) Patent No.: US 7,765,312 B2
(45) Date of Patent: Jul. 27, 2010

(54) APPLYING POLICIES FOR MANAGING A SERVICE FLOW

(75) Inventors: Sylvain Monette, Stockholm (SE); Martin Julien, Laval (CA); Benoit Tremblay, Laval (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 718 days.

(21) Appl. No.: 11/684,881

(22) Filed: Mar. 12, 2007

(65) Prior Publication Data

US 2008/0228932 A1    Sep. 18, 2008

(51) Int. Cl.
G06F 15/16        (2006.01)

(52) U.S. Cl. .................. 709/229; 709/234; 709/235; 709/224

(58) Field of Classification Search .................. 709/229, 709/234, 235, 224
See application file for complete search history.

(56) References Cited

U.S. PATENT DOCUMENTS

| | | | |
|---|---|---|---|
| 6,449,650 B1 | 9/2002 | Westfall et al. | |
| 6,959,335 B1 | 10/2005 | Hayball et al. | |
| 7,043,564 B1 * | 5/2006 | Cook et al. | 709/246 |
| 7,082,102 B1 * | 7/2006 | Wright | 370/229 |
| 7,102,996 B1 * | 9/2006 | Amdahl et al. | 370/230 |
| 7,346,677 B1 * | 3/2008 | Mohaban et al. | 709/224 |
| 7,505,463 B2 * | 3/2009 | Schuba et al. | 370/392 |
| 2005/0278431 A1 * | 12/2005 | Goldschmidt et al. | 709/207 |
| 2006/0075093 A1 * | 4/2006 | Frattura et al. | 709/224 |
| 2006/0075480 A1 * | 4/2006 | Noehring et al. | 726/12 |
| 2007/0078955 A1 * | 4/2007 | Siliquini et al. | 709/220 |

FOREIGN PATENT DOCUMENTS

| | | |
|---|---|---|
| WO | 01/61524 A1 | 8/2001 |
| WO | 02/33428 A1 | 4/2002 |

OTHER PUBLICATIONS

Internet Protocol, Darpa Internet Program Protocol Specification, RFC 791, Sep. 1981.
K. Nichols et al., Definition of the Differentiated Services Field (DS Field) in the IPv4 and IPv6 Headers, Network Working Group, RFC 2474, Dec. 1998.
P. Newman et al., Ipsilon Flow Management Protocol Specification for IPv4 Version 1.0, Network Working Group, RFC 1953, May 1996.
International Search Report from corresponding PCT Application No. PCT/IB2008/050754.

* cited by examiner

Primary Examiner—Krisna Lim

(57) ABSTRACT

A method and an access domain node identify and manage a type of service offered by a service provider to user domains. A service template is prepared by the service provider, comprising an address of a server and a protocol identifier, as well as policies for controlling traffic for the service. Upon set up of a connection between a user domain and the service provider, an address of the user domain is added to the service template to produce a service flow management set. Every data packet exchanged between the user domain and the server, in either direction, is related to a service data flow for a given service type by checking for a match between a source address, a destination address, and a protocol type contained therein, with an appropriate service type. Policies from the service flow management set are used to manage the flow of data packets.

29 Claims, 5 Drawing Sheets

APPLYING POLICIES FOR MANAGING A SERVICE FLOW

BACKGROUND OF THE INVENTION

1. Field of the Invention

The present invention relates to a method and a node for identifying a type of service offered by a server to a user domain and for applying traffic policies thereto.

2. Description of the Related Art

It is well known in the art that access networks enable clients to get access to contents from servers. A most frequently used method to provide content from the servers to the clients is by use of so-called "best effort" connections. "Best effort" implies that the access network does not provide any guarantee that a desired content will be actually delivered, or that the content will be delivered according to a specified Quality of Service (QoS), within minimal delay, or with a set priority. In a best effort network every client obtains best effort service, meaning that it obtains unspecified variable bit rate and delivery time, depending on the current traffic load.

FIG. 1 shows a prior art representation of a simple access network 100 used to provide services from a server 110 of a service provider to a user domain 120. The user domain 120 may consist of a single node, or may comprise a plurality of user devices 22a, 22b, consisting of for example several user devices 22a, 22b, in a same household. All of the user devices 22a, 22b within the user domain 120 share a same subscription to the access network 100 and to service providers. Within the access network 100, one or more access domain nodes 130, for example access routers, provide a direct Internet Protocol (IP) connection to the user devices 22a, 22b. The access domain nodes 130 forward IP traffic data, as well as service requests and service responses, between the user domain 120 and the server 110. FIG. 1 is much simplified; those skilled in the art readily recognize that a typical access network 100 would normally comprise tens or hundreds of access domain nodes 130 serving thousands of user domains 120, and providing access to millions of servers 110 on the Internet.

A user of the user domain 120 may request service according to any one of many kinds of services. While services such as File Transfer Protocol (FTP), or downloading of a web page by use of the HyperText Transfer Protocol (HTTP), may favorably be served within a simple best-effort type of access network 100, other services requiring high bandwidth or low latency, such as streaming video and Voice over Internet Protocol (VoIP), are more demanding in terms of Quality of Service (QoS).

Currently, the Internet Protocol version 4 (IPv4), as specified in the Request For Comments (RFC) 791 of the Internet Engineering Task Force (IETF), carries a Type Of Service (TOS) parameter within a header of each IPv4 packet. RFC 2474 "Definition of the Differentiated Services Field (DS Field) in the IPv4 and IPv6 Headers" further defines possible values to the TOS parameter. It is possible to use the TOS parameter to indicate that an IPv4 packet should be delivered with higher priority, or with a lower delay, than in a simple best effort connection. Still, the possible TOS values are very limited in range and do not provide a means to specify to routers in a network, with a high level of granularity, the demanding QoS parameters required for some of today's services.

There is currently no efficient means for a server 110 to provide a unique definition of services, enabling a use of advanced information about required QoS parameters that may need to be instantiated upon setting up of sessions with user domains 120.

SUMMARY OF THE INVENTION

There would be clear advantages of having a method and nodes for identifying services in a manner ensuring that demanding QoS parameters can be enforced within a network, in order to provide enhanced services between servers and user devices.

It is therefore a broad object of this invention to provide a method and a node for identifying a service offered by a service provider, and for specifying related end-to-end traffic policy parameters.

A first aspect of the present invention is directed a method of applying policies to an identified type of service provided by a server to a user domain. A service template, comprising an address of a server, a protocol identifier, and one or more traffic policies for use in handling of the identified service type, is first prepared. Then, a service flow management set is provided by completing the service template by addition of an address of the user domain. As a packet is received, comprising a source address, a destination address, and a protocol type, the packet also comprising data in relation to the identified service type, the service flow management set is identified by matching these source and destination addresses, as well as the protocol type, with the addresses and the protocol identifier in the service flow management set. The data is exchanged in a service flow between the user domain and the server by use of the one or more traffic policies.

A second aspect of the present invention is directed to a variant of the hereinabove method. A service provider node prepares a plurality of service templates for a plurality of service types. Production of the service flow management set takes place in response to receiving a service request from the user domain, the service request identifying a given service type. Where a plurality of service requests are received from the user domain, distinct service flow management sets are produced, according to service types identified in the plurality of service requests.

A third aspect of the present invention is directed to another variant of the hereinabove method. A service provider node prepares two or more service templates for two or more aspects of a same service offering. Production of two or more service flow management sets takes place in response to receiving a service request from the user domain, the service request identifying the service offering.

A fourth aspect of the present invention is directed to an access domain node for applying traffic policies to a service flow between a user domain and a server. The access domain node comprises a memory for storing a service template. The service template comprises an address of the server, a protocol identifier, and one or more traffic policies. The access domain node also has a control logic adapted to produce a service flow management set by adding an address of the user domain to the service template. Two input-output devices, one on a server side and one on a user domain side, are adapted to receive data packets, each packet comprising a source address, a destination address, a protocol type, and data. A policy processor identifies the service flow management set by matching the source address, the destination address, and the protocol type with the service flow management set, and applies the one or more traffic policies to the data. The packets are then forwarded towards their destination by the input-output devices.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

Figure 1:
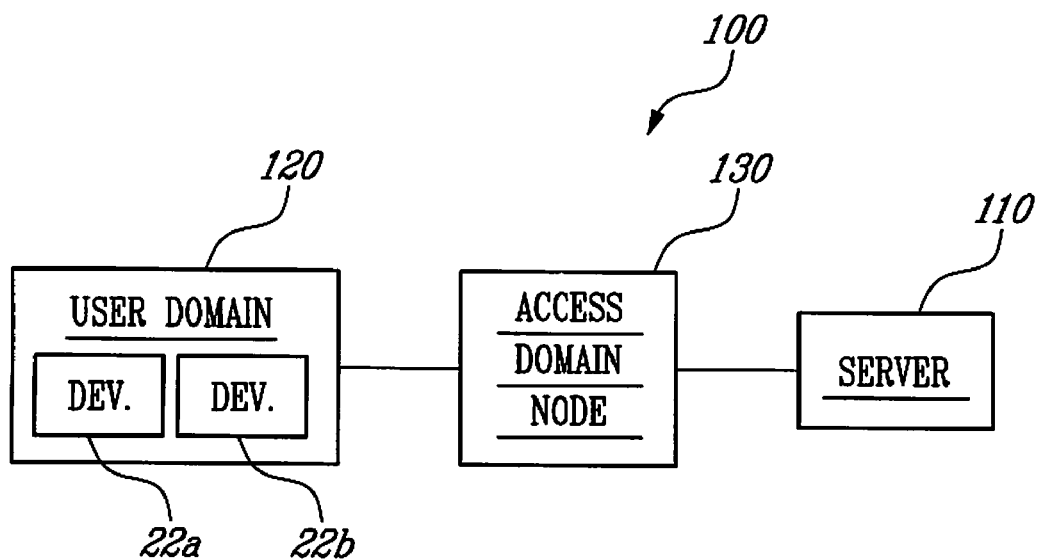
FIG. 1 is a prior art representation of a simple access network.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and a node for identifying service types and to efficiently apply policies for managing services offered by service providers to user domains. Service types offered by a server are used to prepare service templates. Each service template comprises policy parameters, such as for example Quality of Service (QoS) parameters, information useful in addressing the server, including an address of the server that actually delivers the service, a protocol identifier, and further comprises an empty data field intended to be filled by the addition of information useful in addressing a user domain. Depending on the protocol identifier, the template may also comprise a port of the server, which may be a well-known port such as, for example, port 25 for Simple Mail Transfer Protocol (SMTP), and may also comprise another empty data field intended to be filled by the addition of a port of the user domain. The service templates are preferably prepared by servers of the service providers, and preferably sent to access domain nodes providing network access to user domains. Such access domain nodes, which may for example be access routers of Internet Service Providers (ISP), preferably store the service templates upon receipt.

When a user desires to obtain a service of a specific type from a service provider, a user domain sends a request towards a server of the service provider. The request comprises a user address and may further comprise a port of the user. If the server accepts the service requests, it forwards the user address, and the port if included in the request, to the access domain node. In the access domain node, a service flow management set is instantiated by copying a content of a service template for the specific service type, filling the empty fields of the template with the user address, and with the user port if available. Thereafter, a service flow is produced whereby packets of traffic data are exchanged between the user domain and the server, through the access domain node. Each packet carries a source address, a destination address and a protocol type, wherein the source and the destination respectively designate either the user domain or the server, depending on a direction of the traffic data. The access domain node matches, for each packet, the source and destination addresses and the protocol type with the server address, the user address, and the protocol identifier, in order to relate the packet with the appropriate service flow. The access domain node applies the policy parameters of the appropriate service flow management set to forward the flow of traffic data towards its destination, either transparently, or by modifying, delaying, dropping, or substituting data packets.

In the context of the present invention, a service provider may comprise one or many servers. The service provider may have one server per each type of service it offers. Alternatively, a given server may be capable of supporting several service types. Several servers within a same service provider domain may be used for load sharing, redundancy, or may be selected according to a geographical distance from a requesting user domain. A server may simply authorize access to a service while one or more other servers of the same service provider may actually deliver content to users. Generally, the description of the present invention may be read considering equivalence of the terms "server" and "service provider".

One service provider typically serves a very large number of user domains. A user domain may comprise one or more user devices such as computers, television set-top boxes, personal digital assistants and the like, generally found in a single household or within a single office. The user domain may consist of a mobile device, in which case the location of the user domain or user device may change with time and, thereby, the user domain may access any of a multiplicity of access domain nodes. The user domain may get service from a variety of distinct access providers such as ISPs. One user domain may act as a server for another user domain; as a result, the present invention may involve two distinct user domains, wherein each user domain acts as a server towards the other user domain.

The access domain node may be a router, a Wireless Local Area Network (WLAN) router, and the like. Typically, the access domain node serves a large number of user domains. Instead of being implemented in a single node, the features of the access domain node may be shared between several nodes. For example, a resource manager may store a list of service templates and provide the relevant service template to a router when instantiation of a service flow management set is required. Also, two distinct routers present in a path between the user domain and the server may have copies of the service flow management set information and may each apply some or all of the policy parameters to the service flow. A router located proximate to the user domain may preferably apply policies that relate to uplink traffic, while another router located proximate to the server would preferably apply policies that relate to downlink traffic.

Addresses used by the user domain and by the server may take the form of Internet Protocol (IP) addresses. Alternatively, other types of addresses may be used. For example Ethernet Medium Access Control (MAC) addresses obtained from translation of IP addresses by use of Address Resolution Protocol (ARP), or Point-to-Point Protocol over Ethernet (PPPoE) session identifiers. Also, MultiProtocol Label Switching (MPLS) labels may be used instead of IP addresses.

Instead of having a specific address for designating the server or the user domain, a range of addresses may be advantageously used. For example, several servers of a same service provider may be reachable at within a range of IP addresses identified by a network address. An exemplary network address for a server could take the form of "192.168.4.x". Applying any value within a range of [1-255] to the field "x" would produce a standard IP version 4 (IPv4) address within the range of the network address. The terminology used herein, referring to addresses, is to be understood as encompassing specific addresses, for example IP addresses, MPLS labels, or MAC addresses, as well as ranges of addresses such as network addresses, and the like.

In the present invention, the term "service flow" describes a suite of data packets exchanged between a source and a destination, for example between a service provider and a user domain, or more specifically between a server of the service provider and a user device of the user domain. Data traffic may flow in either directions between the server and the user domain. Packets within a service flow, or service data flow, may form a continuous or a discontinuous flow, in the sense that some services will provide a stream of data packets in a rather consistent fashion, while some other services will provide data packets on an as-needed basis, with possible long delays between packets or between groups of packets. All packets within the flow generally relate to a type of service, or to a particular component of a service offering.

Figure 2:
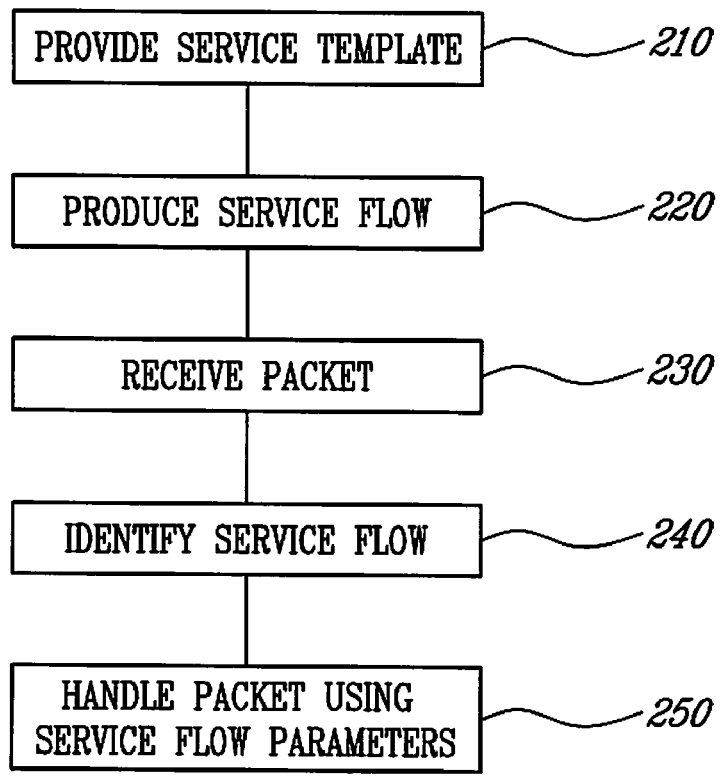
FIG. 2 shows a representation of a method to define and use service flow management sets.

Reference is now made to the Drawings, in which FIG. 2 shows a representation of a method to define and use service flow management sets. A service flow management set is prepared and used, as shown in the method of FIG. 2, in order to ensure that a type of service offered to a user domain is delivered in compliance with policies selected by a service provider. The process starts at step 210 where a service template is provided, comprising parameters that define a service type. The service template may be prepared in a first node, for example in a server and forwarded for later use in a second node, for example in a router. Alternatively, the service template may be used in the same node where it has originally been prepared. The parameters of the service template are described in FIG. 3, which shows an exemplary service template 300 according to an aspect of the present invention.

Figure 3:
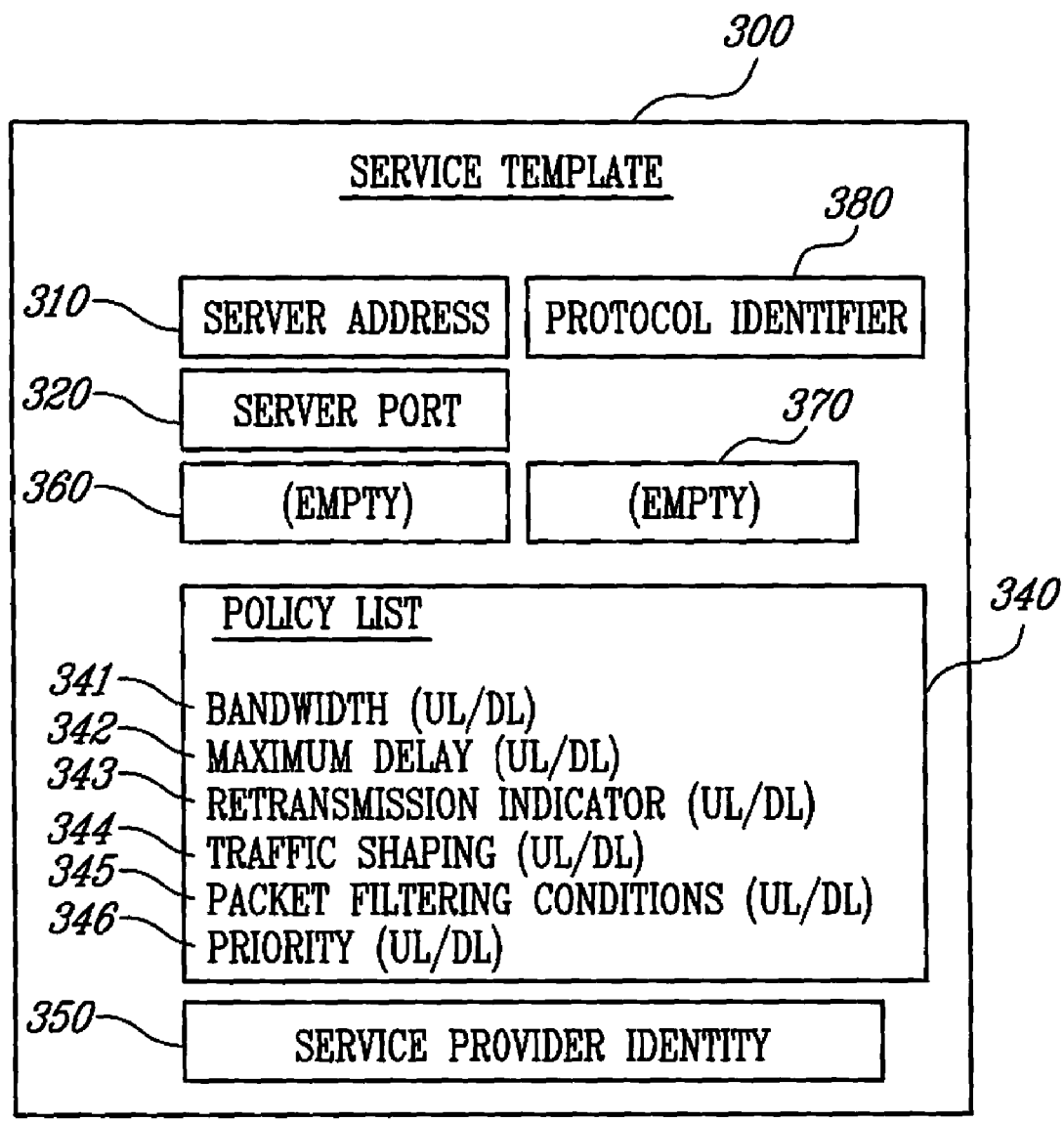
FIG. 3 shows an exemplary service template according to an aspect of the present invention.

As shown in FIG. 3, the service template 300 comprises an address 310 of a server that actually provides the type of service defined by the service template 300. The address 310 may be for example an IP address. A protocol identifier 330 as is found in an IP header, for example a Transmission Control Protocol (TCP), a User Datagram Protocol (UDP), a Stream Control Transmission Protocol (SCTP), or an Internet Control Message Protocol (ICMP) is also included. A port 320 of the server may optionally be included, where applicable depending on a value of the protocol identifier 330. Preferably, the server address 310, the protocol identifier 330, and the port 320 if included, form a unique combination for a given service type. The service template 300 comprises two empty fields: A first empty field 360 is prepared for eventually receiving an address of a user of the service defined by the service template 300. A second empty field 370 is prepared for optionally receiving a port number of the user. A list 340 comprises one or more policies for controlling a service flow, part of the service template 300, the policies being selected upon configuration of a service offering by the service provider in accordance with the needs of the type of service. Within the list 340 may be found exemplary QoS parameters and other types of parameters, such as bandwidth in the uplink and/or downlink direction 341, maximum uplink and/or downlink delay 342, indicator 343 that retransmission in uplink/downlink direction is allowed or not, traffic shaping parameters 344 for attenuating traffic peaks in the uplink and/or downlink direction, packet filtering conditions in uplink and/or downlink directions 345, packet priority in uplink and/or downlink directions 346, and the like. It should be understood that the list of parameters 341-346 is only exemplary and that other types of QoS parameters, priority, or traffic shaping parameters could form the content of the list 340 without departing from the spirit of the present invention. The service template 300 may further comprise a service provider identity 350. In some networks such as in IP version 6 (IPv6) networks, it is possible to ensure uniqueness of the server address 310. However, in IPv4 networks, a same IP address may be allocated to more than one node. Even in the case of IPv6 networks, ensuring uniqueness of addresses 310 requires complex handling, which is not always implemented. In such cases, the service provider identity 350 may advantageously be added to the service template 300 in order to uniquely identify the server. The service template 300 may be prepared and stored within one node, or may be prepared within a first node and stored for later use in a separate node.

Figure 4:
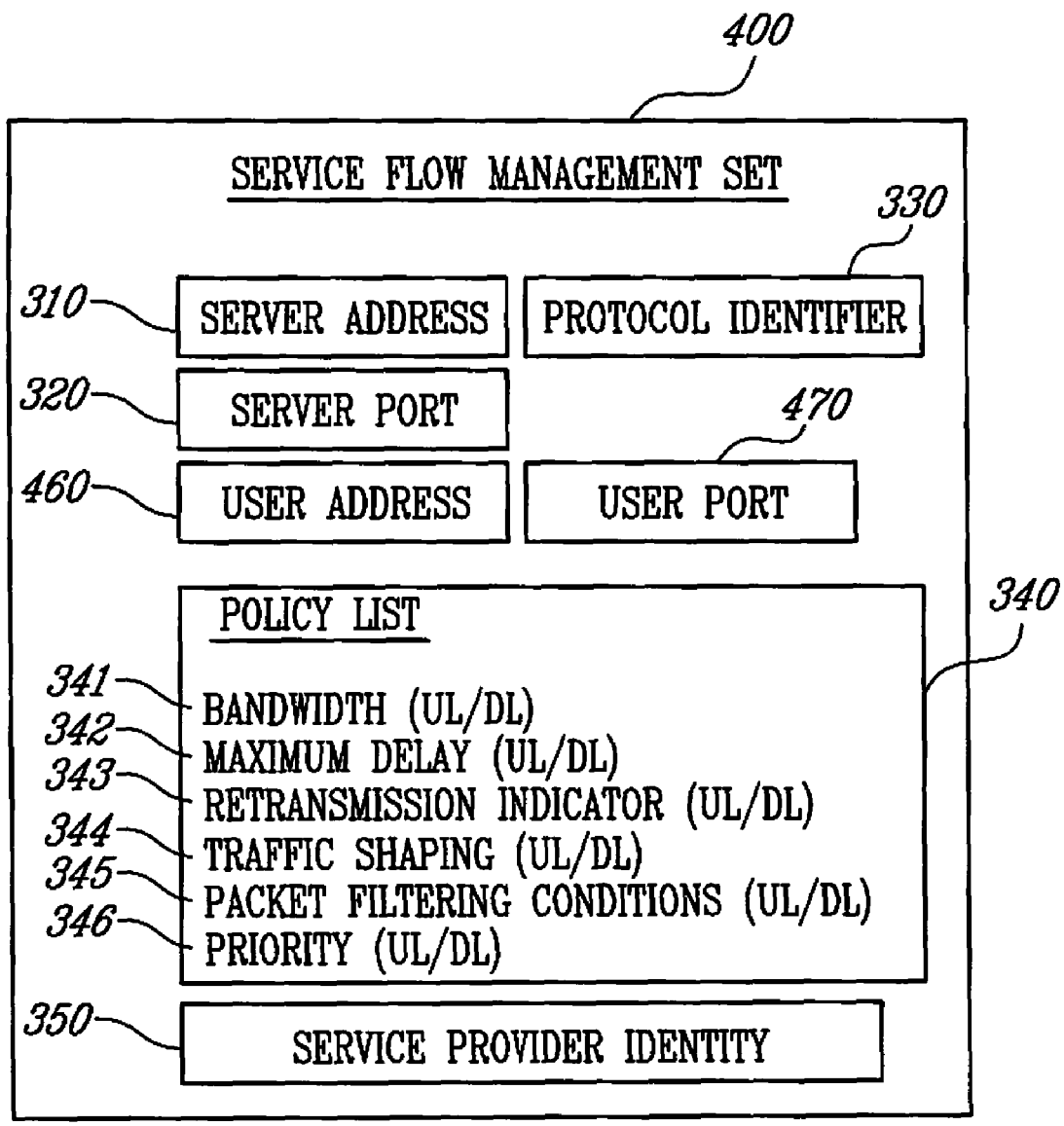
FIG. 4 shows an exemplary service flow management set according to an aspect of the present invention.

Returning to FIG. 2, a service flow management set is produced at step 220. The service flow management set 400 may be produced in the node where the service template 300 was first prepared, or in a separate node where the service template 300 was stored. The service flow management set is produced when required for a specific user of the service identified by the service template. This may be responsive to receipt of a signal or message requesting set up of a session from the user domain, the signal or message comprising an indication of a user address and, optionally, of a user port. The user address and the optional user port may alternatively be obtained by other means, for example by manual configuration of information related to a selected user domain allowed to obtain service from a secure network. Production of the service flow management set 400 is made by copying the content of the service template 300, overwriting the empty fields 360 and 370 with the address of the user domain and, optionally, with the port number of the user domain. FIG. 4 shows an exemplary service flow management set 400 according to an aspect of the present invention. The service flow management set 400 comprises all information from the service template 300, to which are added a user address 460, and an optional user port 470, which in effect fill the empty fields 360 and 370, respectively, of the service template 300. In order to uniquely identify a given service type offered to a user domain, the server address 310, the protocol identifier 330, and the user address 460, along with the server port 320 and the user port 470 if included, must form a unique combination within a same network, and appear in one single service flow management set 400.

In many cases, when the service type defined by the service template 300 is of a unicast category, the user address 460 may be an IP address allocated to a user device within the user domain. In those cases, the user port 470 may be a port number of the same user device, selected according to internal implementation of the user device. Alternatively, when the service type defined by the service template 300 is of a multicast category, the user address is not related to any specific user device, but may rather be a multicast IP address that relates to a multicast group, that is, a group of user devices having an interest to the same multicast service. In the multicast service case, the user port 470 is a port number that all devices in the multicast group use to access the multicast service.

Still in FIG. 2, data traffic is exchanged in a service flow established between the server and the user domain according to the parameters in the policy list 340 of the service flow management set 400. At step 230, a data packet is received, comprising a source address, a destination address, a protocol type and, optionally, a source port and a destination port. Depending on a direction of the data traffic, the source may be the server and the destination may be the user domain, in which case the traffic direction is downlink. In an uplink direction, the source is the user domain and the destination is the server. At step 240, the source and destination addresses, the protocol type, and the ports if included, are matched with the server address 310, the user address 460, the protocol identifier 330 and, optionally, with the server port 320 and the user port 470, thereby identifying the appropriate service flow management set 400. At step 250, the data packet is handled according to parameters in the policy list 340 of the appropriate service flow management set 400. Data, which is related to the type of service uniquely identified by the service flow management set 400, is contained in the data packet. Compliance of the data with the parameters in the policy list 340 is verified. The data may be forwarded, delayed, dropped, filtered, or otherwise modified based on the policy list 340. By way of an example, the priority 346 in the policy list 340 may indicate that the data has a low priority. In case of traffic overload, the data packet may be delayed, if the maximum delay 342 indicates that delaying the packet is allowed. Alternatively, the data packet may be deleted and not forwarded, if the maximum delay 342 indicates that the packet may not be delayed at all.

Figure 5:
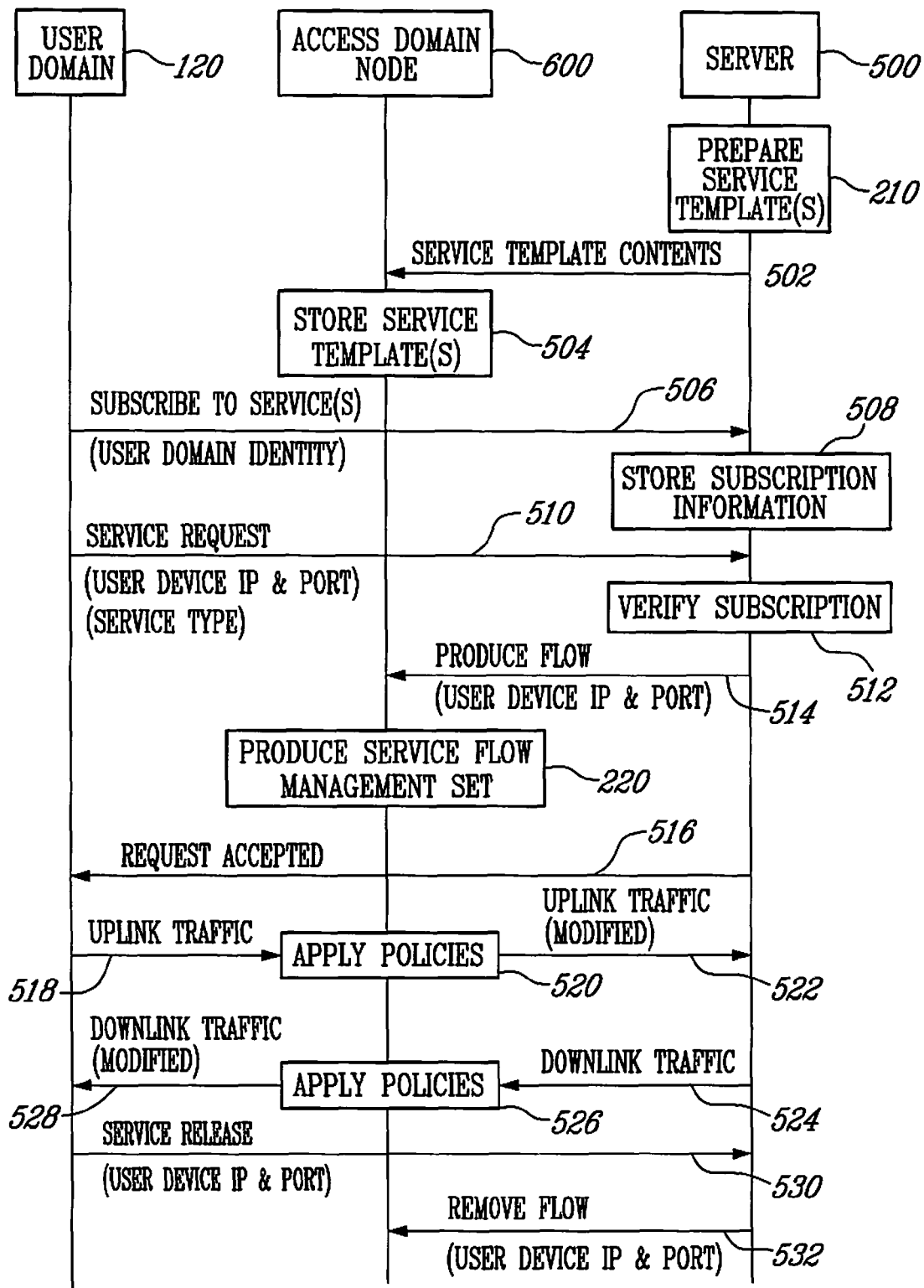
FIG. 5 shows an exemplary signaling diagram according to an aspect of the present invention.

Having now described hereinabove a method of defining and using service templates 300 and service flow management sets 400, aspects of the preferred embodiment of the present invention will now be described by reference to FIG. 5, which shows an exemplary signaling diagram according to an aspect of the present invention. FIG. 5 shows interaction between one server 500, one user domain 120, and one access domain node 600. It should be understood that a typical access network would normally comprise a large number of access domain nodes 600, and an even larger number of user domains 120. Various types of access domain nodes 600 could comprise for example access routers providing direct access to user domains 120, and concentrators. In a single user domain 120 could reside one or more user devices (not shown, but depicted in FIG. 1). The access network would provide access to a multiplicity of service provider domains, each of which comprising one of more servers 500. Within a service provider domain, one could find several specialized nodes such as application function nodes (not shown) in addition to various types of servers 500. The following description of signaling between the server 500, the access domain node 600, and the user domain 120 is illustrative and simplified.

At step 210, the server 500 prepares one or more service templates 300, for one or more corresponding service types. Step 210 is the same as described in relation to FIG. 2. At step 502, the server 500 sends towards the access domain node 600 a message comprising a content of each of the service templates 300. The message of step 502 uniquely identifies each service template 300, either by unique combination of the server address 310, optional server port 320, and protocol identifier 330, or by use of a separate service template identifier. The access domain node 600 stores the one or more service templates 300 in memory at step 504. Step 210 may be executed in the server 500 when existing service types are modified, or when new service types are introduced. Steps 502 and 504 are executed consecutive to step 210, or when the server 500 gets into a new relationship with a new access domain node 600. Steps 502 and 504 could also be executed at other times, for example upon recovery from memory loss in the access domain node 600.

At step 506, a user of the user domain 120 initiates a request for subscribing to one or more selected services. A message is sent towards the server 500, possibly transmitted through the access domain node 600. The message comprises an identity of the user, corresponding to an identity of the user domain 120, and a list of selected services. Examples of services may comprise Video-On-Demand (VOD), or Voice over IP (VoIP). At step 508, the server 500 stores subscription information for the user domain 120 and the selected services. For some types of services offered by the server 500, subscription may not be required and steps 506-508 may be omitted.

At step 510, the user initiates a request for setting up a service session. This may be done for example by turning on a user device comprised within the user domain 120, for example a television set-top box. The user domain 120 sends a service request towards the server 500, comprising an indication of the requested service type, with an address and an optional port number of the user device, if the requested service type is unicast. For a multicast IP service, the address and optional port number would be, respectively, a multicast IP address and a port number common to all user devices in a multicast group. For simplicity and without loss of generality, the following description assumes that a unicast service is requested. The service request may be transmitted through the access domain node 600. If applicable to the service type, the server 500 verifies at step 512 that the user domain 120 is subscribed to the requested service. The server 500 may at the same time initiate an accounting process for billing the user. The server 500 sends a message towards the access domain, at step 514, requesting it for produce a service flow management set 400. The message positively identifies a relevant service template 300, for production of the service flow management set 400, by use of the combination of the server address 310, the protocol identifier 330, and the optional server port 320, or by use of the service template identifier. The message comprises the user device address and may comprise the optional port number. At step 220, which is the same as described in relation to FIG. 2, the access domain node produces the service flow management set 400 by adding the user device address and optional port number, as the user address 460 and the optional user port 470, to the content of the service template 300.

A single access domain node 600 may concurrently provide access to a same unicast service type from the same server 500 to several user domains 120. Within that access domain node 600, the service template 300 for the service type of the server 500 is instantiated only once, but the service flow management set 400 is instantiated as many times as there are user domains 120 concurrently accessing the service. For a multicast service type from a server 500, being served through the access domain node 600, the service flow management set 400 is instantiated by the access domain node 600 only once for a multicast group, no matter the number of user domains 120 within the multicast group.

Preferably, the server 500 informs the user domain 120 that the request is accepted at step 516.

Thereafter, data traffic in the form of packets is exchanged in a service flow established between the server 500 and the user domain 120, through the access domain node 600. Traffic may flow in a downlink direction, from the server 500 towards the user domain 120, in an uplink direction, from the user domain 120 towards the server 500, or in both directions. If the service type is VOD, virtually all of the traffic is in the downlink direction, apart for some minor amount of control signaling sent by the user domain 120. In the case of a VoIP telephony service, traffic flows in both directions.

Data packets transit through the access domain node 600, which applies policies from the service flow management set 400. For example, an uplink data packet sent from the user domain 120 at step 518 arrives at the access domain node 600, containing a source address of the user, a destination address of the server 500, a protocol type and, optionally, a source port of the user and a destination port of the server 500. The access domain node 600 identifies the proper service flow management set 400 by matching the protocol identifier 330 and the user and server addresses and the optional ports contained therein with the received source and destination addresses, protocol type and optional ports. Any data packet having source and destination addresses, or protocol type, or optionally ports, not matching any service flow management set 400 of the access node 600 would be handled according to manners known in the prior art, for example transferred through the access node 600 in best effort mode. At step 520, the access domain node 600 verifies that the data packet can be forwarded as is, modified, or deleted, according to the policies. By way of an example, data contained in a single VoIP packet sent by the user device, representing a fraction of a second of speech, may be deleted according to a policy of the service flow management set 400, if a threshold is exceeded indicating that too much traffic is being transmitted towards the server 500. Policies of the service flow management set 400 would not allow delaying that VoIP packet, considering that delaying a packet would degrade speech quality even more than simply dropping the same packet. The packet, if not deleted, is forwarded towards the server at step 522. In another example, a packet containing VOD data is sent from the server 500, in the downlink direction, at step 524. At step 526, the access domain node applies policies from a service flow management set 400 that matches addresses, protocol type and optional ports contained in the packet of VOD data, and that comprises policies for VOD service. In case of traffic overload, a given policy may indicate that dropping VOD data is not allowed, but that delaying video packets in a traffic shaping mechanism is allowed. At step 528, data packets are forwarded, possibly in modified form, towards the user domain 120. At step 530, the user may request to cease the service session. The server 500 may stop accounting and then informs the access domain node at step 532 to remove the service flow management set 400.

The server 500 may determine that a particular service offering is better served by two or more distinct flows, for which two or more service templates 300 and two or more corresponding service flow management sets 400 are defined. For example, a television service could comprise two service flows for audio and video streams, the two flows having different characteristics managed by distinct policy lists 340 because of different requirements for high quality audio and video signals. The two distinct service templates 300 for the audio and for the video streams would have already been sent from the server 500 to the access domain node 600 at step 502, and stored at step 504. At step 514, the server 500 may favorably indicate to the access domain node 600 that production of two service flow management sets 400 is requested, responsive to a single service request at step 510, if the request is for the television service offering. At least one of the server address 310, the server port 320, the user address 460, the user port 470, or the protocol identifier 330, must be different in the two service flow management sets 400, in order to render them distinguishable. Data traffic is then handled independently in both service flows, at steps 518-528. Likewise, if the service request received at step 510 identifies two independent services having different characteristics, two separate service flow management sets 400 may be produced at step 220 for independently providing the two services from the same server 500 to the same user domain 120.

US patent application number US 2006/0182123, published on Aug. 17, 2006, entitled "Method for aggregating data traffic over an access domain and nodes therefor", and assigned to the assignee of the present application, describes a data service network wherein a service provider offers a service to a user domain through an access network comprising an Access Nodes (AN) and an Access Edge Node (AEN). A service binding is created and stored in the AEN when the user domain requests setting up a service session with a service provider. The service binding content is forwarded to, and stored in, the AN providing access to the user domain. The service binding comprises or relates to an identity of the server, a service type, a server port number, a user device Medium Access Control (MAC) address, a port number of the AN for connecting the user device, QoS parameters, and some other information. Data traffic sent in the downlink direction from the service provider passes through the AEN and then through the AN prior to arriving at the user domain. The QoS parameters contained in the service binding are used by the AEN and by the AN to manage handling of the data traffic. A service binding as described in US 2006/0182123 identifies a relationship between a user domain and a server, but it cannot uniquely identify a specific service type. The service binding works at a MAC address level, and thus does not support specific handling of data packets based on a specific combination of user and server addresses, protocol types, or port numbers. Further, an existing service binding set up for an ongoing session, according to US 2006/0182123, does not provide the capability for the user to select new services, for which specific QoS parameters could be specified from the same service provider. In US 2006/0182123, one service binding may only relate to one set of QoS parameters, which may not be suitable for distinct service types. As such, US 2006/0182123 does not provide the capability to efficiently support more than one service, or more than one data stream for a same service, from the same service provider to one user domain.

In some embodiments of the present invention, the AEN described in US 2006/0182123 may be supplemented with similar features as those of the access domain node 600 described hereinabove. A plurality of service templates 300 may be stored in the AEN and one or more service flow management sets 400 may also be instantiated in the AEN, for a given user domain, the service flow management sets 400 becoming part of the service binding for that user domain. As the AEN forwards service binding information to the AN serving the user domain, it may add some information from the service flow management sets 400. The AEN and the AN may both apply the policies comprised in the service flow management sets 400 to the service session. In some cases, the AEN and the AN equally apply all of the policies. Alternatively, the AEN and the AN may each apply some of the policies. For example, when a user device sends many large packets intended for the server, the AN being the first node receiving those large packets may apply a filtering policy and delay or drop some of the packets, thereby preventing overloading the AEN and the server. The AN may favorably apply uplink policies while the AEN applies downlink policies.

Figure 6:
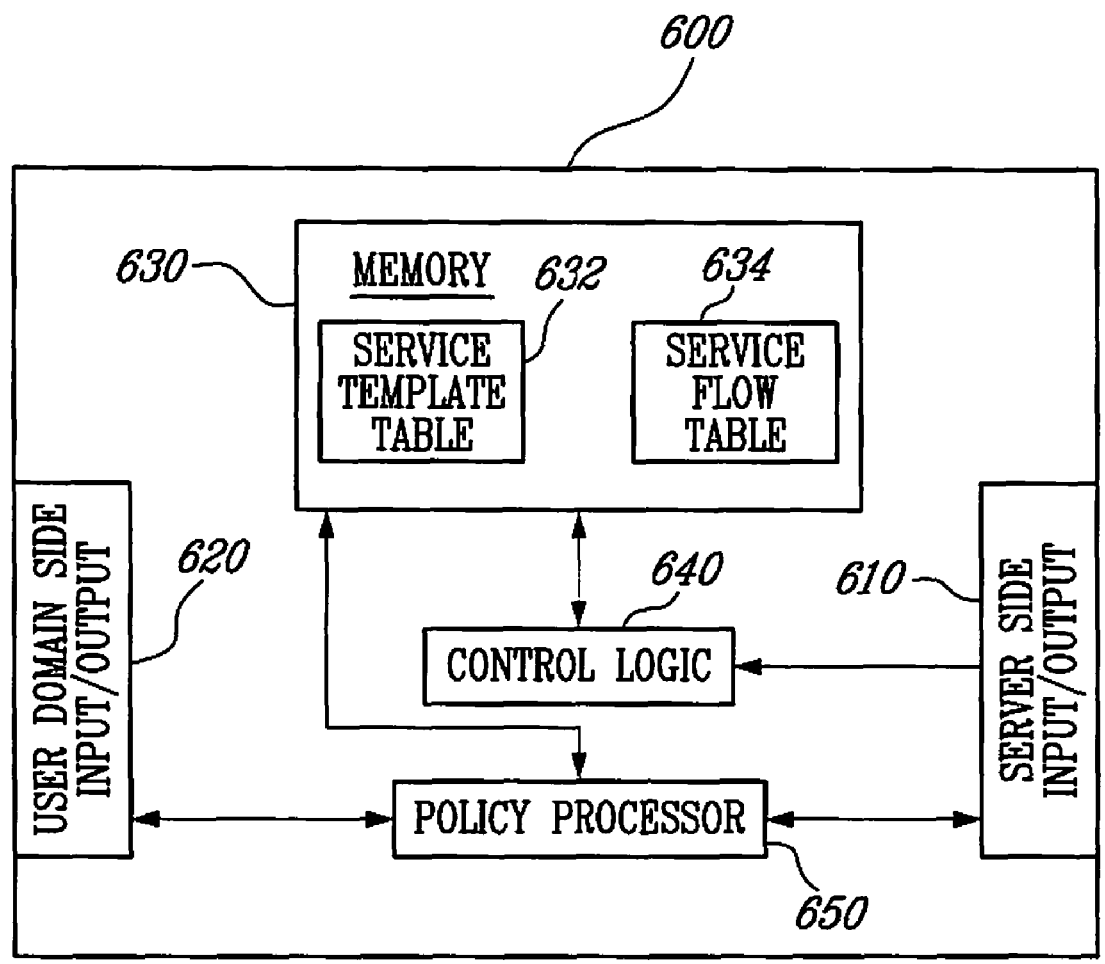
FIG. 6 shows an exemplary access domain node built according to the present invention.

An exemplary construction of an access domain node 600 as used in the preceding figures will now be described by reference to FIG. 6, which shows an access domain node according to the present invention. The access domain node 600 applies traffic policies to a service flow between a user domain 120 and a server 500. The access domain node 600 comprises a server side input-output device 610, a user domain side input-output device 620, a memory 630, a control logic 640 and a policy processor 650. The memory 630 further comprises a service template table 632 and a service flow table 634. Service templates 300 in the service template table 632 are the same as described in relation to FIG. 3. Likewise, the service flow management sets 400 of FIG. 4 describe contents of the service flow table 634.

When a service type and a corresponding service template 300 are created in a server 500, the server 500 sends information comprising the service template 300 towards the access domain node 600. The information arrives at the server side input-output device 610. The server side input-output device 610 forwards the service template 300 to the control logic 640, which in turn writes the service template 300 in an entry of the service template table 632. The service template table 632 may store service templates 300 for a large number of available service types, from many servers 500.

When the server 500 accepts a request for service from a user domain 120, it sends towards the access domain node 600 a request to add a service flow management set 400 for the user domain 120. The request comprises a user address and, optionally, a user port. The request is received at the server side input-output device 610 and forwarded to the control logic 640. The control logic 640 reads the appropriate service template 300 from the service template table 632, combines its content with the received user address, and with the user port if included, to produce a service flow management set 400, and stores the service flow management set 400 in the service flow table 634. The service flow table 634 may comprise a large number of service flow management sets 400, for a multiplicity of access domain nodes 120.

Traffic within the service flow may pass through the access domain node 600 in an uplink direction, from the user domain 120 towards the server 500, or in a reverse, downlink direction. Both the user domain side input-output device 620 and the server side input-output device 610 may then receive the flow of traffic in the form of data packets. Each data packet comprises an uplink or downlink source address, an uplink or downlink destination address, a protocol type, and may further comprise an uplink or downlink source port, and an uplink or downlink destination port. For example, a data packet received at the server side input-output device 610 is sent by the server 500 in the downlink direction; that packet therefore comprises a downlink source address and a downlink destination address. Those addresses, protocol type and optional ports are used by the policy processor 650 to identify a corresponding service flow management set 400 within the service flow table 634, by finding a match with the protocol identifier 330 and with the addresses and optional ports of the server and user. Once a match is found, the policies contained in the service flow management set 400 are read by the policy processor 650. The policy processor 650 uses the policies, comprising for example uplink and/or downlink bandwidth 341, uplink and/or downlink maximum delay 342, uplink and/or downlink retransmission indicator 343, traffic shaping 344, uplink and/or downlink packet filtering conditions 345, or uplink and/or downlink priority 346, or any suitable combination thereof, to determine how data packets are handled. Depending on the direction of the data packet, the policy processor preferably makes a selection, amongst the policies of the service flow management set 400, of policies that apply only to uplink, to downlink, or to both traffic directions. Depending on the selected policies, the policy processor 650 may leave packets unmodified, or alternatively drop, filter, delay or make any suitable policy-based modification to the packets, prior to forwarding them through the user domain side input-output device 620 or the server side input-output device 610. For example, if an amount and size of data packets received from a given user domain 120 at the user domain side input-output device 620 exceed a limit set by the uplink bandwidth 341, the traffic is deemed not compliant with the uplink bandwidth 341 and some of the data packets are delayed or dropped by the policy processor 650.

If the server 500 determines that a request for service requires setting up two separate service flow management sets 400 for the user domain 120, two requests to add service flow management sets 400 are received from the server 500 at the server side input-output device 610, either separately or in a combined message. The control logic 640 reads two distinct service templates 300 from the service template table 632 and stores two distinct service flow management sets 400 in the service flow table 634. In such a case, the two distinct service templates 300 may have different contents in their policy lists 340. Preferably, the two distinct service templates 300 are distinguished by having distinct server addresses 310, or distinct server ports 320, or distinct protocol identifiers 330, or any different combination. Alternatively, two distinct service flow management sets 400 allocated to a same user domain 120 may be distinguished by use of distinct user addresses 460 or distinct user ports 470.

In a case where two or more service flow management sets 400 are allocated to one user domain 120, for example a first service flow management set 400 for a VoIP service and a second service flow management set 400 for another data service, the data packets for these two or more applications comprise different sets of source and destination addresses, protocol types, or distinct ports. The policy processor 650 is thus capable of distinguishing between the two or more service flow management sets 400 of the user domain 120 by use of those different sets.

Although several aspects of the preferred embodiment of the method and of the access domain node of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of applying traffic policies to a service type provided by a server to a user domain, the method comprising the steps of:
   providing a service template comprising an address of the server, a protocol identifier, and one or more traffic policies;
   producing a service flow management set by adding an address of the user domain to the service template;
   receiving a packet comprising a source address, a destination address, a protocol type, and data in relation to the service type;
   identifying the service flow management set by matching the source address, the destination address, and the protocol type with the service flow management set; and
   exchanging the data between the user domain and the server using the one or more traffic policies.

2. The method of claim 1, wherein:
   the address of the server, the address of user domain, the source address and the destination address are Internet Protocol (IP) addresses.

3. The method of claim 1, wherein:
   the source address is equal to the user domain address;
   the destination address is equal to the server address; and
   the protocol type is equal to the protocol.

4. The method of claim 1, wherein:
the destination address is equal to the user domain address;
the source address is equal to the server address; and
the protocol type is equal to the protocol identifier.

5. The method of claim 1, wherein:
data traffic is exchanged between the user domain and the server by use of policies comprised in two or more service flow management sets; and
the two or more service flow management sets are based on two or more distinct service templates;
wherein the two or more service flow management sets are associated with two or more complementary aspects of a service offering.

6. The method of claim 5, wherein:
the service offering is a television service;
one of the two or more complementary aspects is an audio stream; and
another one of the two or more complementary aspects is a video stream.

7. The method of claim 1, wherein:
the step of preparing the service template is performed at a service provider node;
the service provider node sends the service template to an access domain node; and
the step of producing the service flow management set is made in the access domain node.

8. The method of claim 7, wherein:
the service template further comprises an identity of a service provider; and
the access domain node uses the identity of the service provider to forward traffic between the service provider and the user domain.

9. The method of claim 1, wherein:
a service provider node prepares a plurality of service templates for a plurality of service types.

10. The method of claim 9, wherein:
the step of producing the service flow management set is made responsive to receiving a service request from the user domain.

11. The method of claim 10, wherein:
the user domain subscribes to one or more of the plurality of service types;
the service request comprises an indication of a desired service type; and
producing the service flow management set is made conditional to the user domain being subscribed to the desired service type.

12. The method of claim 10, wherein:
a plurality of service requests are received from the user domain; and
distinct service flow management sets are produced for each of the plurality of service requests.

13. The method of claim 9, wherein:
the user domain subscribes to one or more of the plurality of service types;
the user domain comprises a plurality of user devices;
a plurality of service requests are received from one or more of the plurality of user devices, each service request comprising an indication of a desired service type;
the one or more of the plurality of user devices are selected according to the desired service types, for each of the plurality of service requests; and
distinct service flow management sets are conditionally produced for each of the plurality of service requests, wherein producing each service flow management set is made conditional to the user domain being subscribed to the desired service types.

14. The method of claim 1, wherein:
the one or more traffic policies comprise packet filtering conditions.

15. The method of claim 1, wherein:
the one or more traffic policies comprise traffic shaping parameters.

16. The method of claim 1, wherein:
the one or more traffic policies comprise quality of service parameters.

17. The method of claim 1, wherein:
the service template is defined for a unicast service; and
the user address is an IP address of a user device comprised in the user domain.

18. The method of claim 1, wherein:
the service template is defined for a multicast service; and
the user address is a multicast IP address used by a plurality of user devices comprised in a plurality of user domains.

19. The method of claim 1, wherein:
the service template further comprises a port of the server;
producing the service flow management set further comprises adding a port of the user domain to the template;
the packet further comprises a source port and a destination port; and
the step of identifying the service flow management set further comprises matching the source port and the destination port with the service flow management set.

20. The method of claim 1, wherein:
at least one of the one or more traffic policies applies in a downlink direction.

21. The method of claim 1, wherein:
at least one of the one or more traffic policies applies in an uplink direction.

22. The method of claim 1, wherein:
at least one of the one or more traffic policies applies both in an uplink direction and in a downlink direction.

23. The method of claim 1, wherein:
the address of the server is a network address.

24. The method of claim 1, wherein:
the address of the user domain is a network address.

25. An access domain node for applying traffic policies to a service flow between a user domain and a server, comprising:
a memory adapted to store a service template comprising an address of the server, a protocol identifier, and one or more traffic policies;
a control logic adapted to produce a service flow management set by adding an address of the user domain to the service template;
a first input-output device adapted to receive a packet comprising a source address, a destination address, a protocol type, and data;
a policy processor adapted to identify the service flow management set by matching the source address, the destination address, and the protocol type with the service flow management set, and to apply the one or more traffic policies to the data; and
a second input-output device adapted to forward the packet.

26. The access domain node of claim 25, wherein:
the one or more traffic policies comprise quality of service parameters.

27. The access domain node of claim 25, wherein:
the service template further comprises a server port;
the service flow management set further comprises the server port and a user domain port;
the packet further comprises a source port and a destination port; and
the policy processor further identifies the service flow management set by matching the source port and the destination port with the service flow management set.

28. The access domain node of claim 25, wherein:
the service flow comprises an uplink direction and a downlink direction; and
the policy processor applies a selection of the one or more traffic policies to data comprised in the uplink direction and another selection of the one or more traffic policies to data comprised in the downlink direction.

29. The access domain node of claim 25, wherein:
the policy processor matches the source address, the destination address, and the protocol type with the address of the user domain, the address of the server, and the protocol identifier.

* * * * *